United States Patent
Li et al.

(10) Patent No.: US 11,688,295 B2
(45) Date of Patent: Jun. 27, 2023

(54) NETWORK LEARNING SYSTEM AND METHOD THEREOF

(71) Applicant: DELTA ELECTRONICS, INC., Taoyuan (TW)

(72) Inventors: Shih-Gong Li, Taoyuan (TW); Shih-Han Chan, Taoyuan (TW); Ming-Kai Jiau, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 851 days.

(21) Appl. No.: 16/561,043

(22) Filed: Sep. 5, 2019

(65) Prior Publication Data

US 2020/0410884 A1    Dec. 31, 2020

(30) Foreign Application Priority Data

Jun. 26, 2019   (CN) .......................... 201910559570.7

(51) Int. Cl.
  *G09B 5/12*    (2006.01)
  *G06Q 50/20*   (2012.01)
  *G06N 20/00*   (2019.01)
  *G09B 5/06*    (2006.01)

(52) U.S. Cl.
  CPC .............. *G09B 5/12* (2013.01); *G06N 20/00* (2019.01); *G06Q 50/205* (2013.01); *G09B 5/065* (2013.01)

(58) Field of Classification Search
  CPC .......... G09B 5/12; G09B 5/065; G06N 20/00; G06Q 50/205
  See application file for complete search history.

(56) References Cited

U.S. PATENT DOCUMENTS

| | | | |
|---|---|---|---|
| 8,620,419 B2 * | 12/2013 | Rotenberg | G09B 7/00 600/544 |
| 10,373,093 B2 * | 8/2019 | Aki | G06Q 10/06393 |
| 2003/0077556 A1 * | 4/2003 | French | A61B 5/1118 434/258 |
| 2005/0003330 A1 | 1/2005 | Asgarinejad et al. | |
| 2009/0047648 A1 * | 2/2009 | Ferreira | G09B 7/00 434/323 |
| 2010/0159430 A1 | 6/2010 | Lee et al. | |

(Continued)

FOREIGN PATENT DOCUMENTS

| | | |
|---|---|---|
| CN | 103823908 A | 5/2014 |
| CN | 104575142 A | 4/2015 |

(Continued)

*Primary Examiner* — Steve Rowland
(74) *Attorney, Agent, or Firm* — CKC & Partners Co., LLC (57) ABSTRACT

A network learning system includes a host being coupled to a first user end and a second user end. A processor of the host end is configured to perform the following steps of: storing original lesson information being sent from the first user end in which the original lesson information has a plurality of content sections; selecting the content sections to form adaptive lesson information based on a learning condition of the second user end; sending the adaptive lesson information to the second user end so that an output device of the second user end outputs the adaptive lesson information based on a view of a simulated space; when the output device of the second user end outputs the adaptive lesson information, recording a value from an input device of the second user end.

20 Claims, 5 Drawing Sheets

(56) References Cited

U.S. PATENT DOCUMENTS

| | | | |
|---|---|---|---|
| 2011/0189643 A1 | 8/2011 | Hutchinson et al. | |
| 2012/0288846 A1 | 11/2012 | Hull | |
| 2017/0083626 A1* | 3/2017 | Kensel | G06F 16/9577 |
| 2018/0301046 A1* | 10/2018 | Nedivi | H04L 51/046 |
| 2019/0244127 A1* | 8/2019 | Amado | G09B 5/06 |
| 2019/0385471 A1* | 12/2019 | Harris | G06F 16/90335 |
| 2019/0392725 A1* | 12/2019 | Zalkins | G09B 9/00 |
| 2020/0234487 A1* | 7/2020 | Clapp | G06T 1/60 |
| 2020/0357296 A1* | 11/2020 | Sharma | G06Q 50/2057 |

FOREIGN PATENT DOCUMENTS

| | | |
|---|---|---|
| CN | 109102727 A | 12/2018 |
| TW | 201545105 A | 12/2015 |
| TW | I614734 B | 2/2018 |
| TW | I630588 B | 7/2018 |

\* cited by examiner

NETWORK LEARNING SYSTEM AND METHOD THEREOF

CROSS-REFERENCE TO RELATED APPLICATION

This application claims priority to China Application Serial Number 201910559570.7, filed on Jun. 26, 2019, which is herein incorporated by reference.

BACKGROUND

Technical Field

The present disclosure relates to a computing system and a computing method. More particularly, the present disclosure relates to a computing system and a computing method for building a virtual learning environment via a network.

Description of Related Art

Conventional teaching programs applied in real classrooms provide learners with intuitive experiences, but these programs are limited to time and space. Some online learning platforms try to overcome such limitations, but most of these platforms can only provide learning videos that cannot be modified. Also, these platforms are lacking for efficient evaluation mechanisms, field practices, and/or user interactions. Moreover, these approaches fail to consider the impact of the limitations of hardware ability for a user for the effect of learning.

SUMMARY

To solve the aforementioned problems, the present disclosure has provided the following embodiments.

Some embodiments of the present disclosure are related to a network learning system. The network learning system at least includes a host end. The host end is coupled to a first user end and a second user end. The host end includes a memory and a processor. The memory and the processor are coupled with each other. The memory is configured to access the at least one instruction to perform the following: storing original lesson information sending from the first user end, in which the original lesson information includes multiple content sections; selecting from the plurality of content sections to form first adaptive lesson information based on a learning condition of the second user end; sending the first adaptive lesson information to the second user end so that an output device of the second user end outputs the first adaptive lesson information based on a first view of a first simulated space; and recording a value from an input device of the second user end when the output device of the second user end outputs the first adaptive lesson information.

Some embodiments of the present disclosure are related to a network learning method. The network learning method is performed by a host end. The network learning method at least includes following steps: storing original lesson information sending from a first user end, wherein the original lesson information includes multiple content sections; selecting from the content sections to form first adaptive lesson information based on a learning condition of a second user end; sending the first adaptive lesson information to the second user end so that an output device of the second user end outputs the first adaptive lesson information based on a first view of a first simulated space; and recording a value from an input device of the second user end when the output device of the second user end outputs the first adaptive lesson information.

Based on the embodiments above, the present disclosure at least provides a network learning system and a network learning method. The system and the method adapt users with different contents of a lesson according to their learning conditions and provide such lesson to the users via a virtual classroom.

BRIEF DESCRIPTION OF THE DRAWINGS

Reference can be made to embodiments and drawings in following paragraphs for better understandings of present disclosure.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the following description and claims, the terms "first", "second", and the like are not intend to limit a specific order of the units being described.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

In the following description and claims, some of the directions "up", "down", "before", "after", "prior to", "behind" and the like can be considered as references along with the figures. The scope of present disclosure should not be limited thereto.

Figure 1:
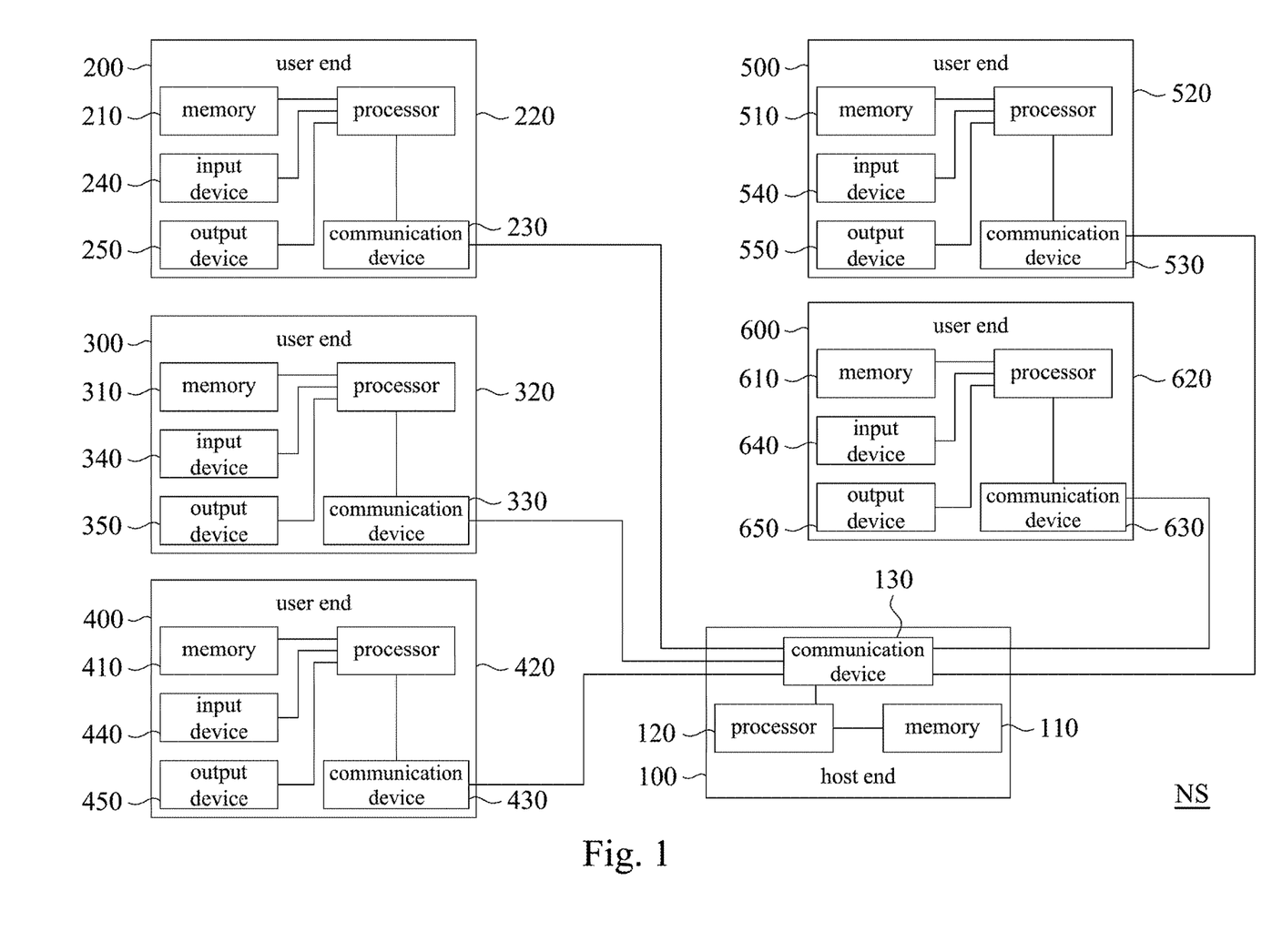
FIG. 1 is a schematic diagram showing a network learning system according to some embodiments of present disclosure.

Reference is made to FIG. 1. FIG. 1 is a schematic diagram showing a network learning system according to some embodiments of the present disclosure. As shown in FIG. 1, in some embodiments, a network learning system NS includes a host end 100. The host end 100 at least includes a memory 110, a processor 120, and a communication device 130. The memory 110 and the processor 120 are electrically/communicatively coupled with each other. The processor 120 and the communication device 130 are also electrically/communicatively coupled with each other. In some embodiments, the memory 110 and the processor 120 of the host end 100 can be settled in the same place to form a server, or can be settled in different places to form a cloud server.

It is noted that the term "electrically coupling" and "communicatively coupling" can refer to a physical connection or a non-physical connection. For example, in some embodiments, the processor 120 can be coupled to the memory 110 via a wireless communication standard. In other embodiments, the processor 120 can be coupled to the memory 110 via a physical cable. Via such connection, the memory 110 and the processor 120 can establish unidirectional/bidirectional information exchange.

In some embodiments, the memory 110 can include, but not limited to, at least one of a flash memory, a hard disk drive (HDD), a solid-state drive (SSD), a dynamic random access memory (DRAM) and a static random access memory or a combination thereof. In some embodiments, as being a non-transitory computer readable medium, the memory 110 can store at least one computer readable instruction that can be accessed by the processor 120.

In some embodiments, the processor 120 can include, but not limited to, a single processor or an integration of multiple microprocessors, such as a central processing unit (CPU), a graphics processing unit (GPU) or a application-specific integrated circuit (ASIC), etc. In some embodiments, the processor 120 can access and execute the computer readable instructions read from the memory 110 in order to perform at least one application program to accomplish functions of the host end 100. For better understandings of the present disclosure, details of the application program performed by the processor 120 will be introduced in following paragraphs.

In some embodiments, the communication device 130 can include, but not limited to, a router, a gateway, etc. The communication device 130 is used to connect the processor 120 with a network, in order to transfer deliver/filter/encrypt/decrypt information. In this manner, the processor 120 can establish unidirectional/bidirectional information exchange with other devices in the network.

As shown in FIG. 1, in some embodiments, the network learning system NS includes a plurality of user ends 200-600. Each of the user ends is electrically/communicatively coupled to the host end 100 to establish unidirectional/bidirectional information exchange with the processor 120 via the communication device 130. In some embodiments, a hardware configuration of the user ends 200-600 can include, but not limited to, memories 210-610, processors 220-620, communication devices 230-630, input devices 240-640 and output devices 250-650.

In some embodiments, functions of the memories 210-610 and the processors 220-620 are similar to those of the memory 110 and the processor 120 of the host end 100. The processors 220-620 can access and execute computer readable instructions from the memory 210-610 to run applications, so that the operations of the user ends 200-600 can be established. In some embodiments, the communication devices 230-630 includes, but not limited to, network interface controllers that are configured to connect to a network directing to the host end 100.

In some embodiments, the input devices 240-640 can include, but not limited to, a mouse, a keyboard, a graphics tablet, a touch display, a microphone, an inertial detector, a brainwave detector, an optical sensor, a camera, a temperature sensor, a humidity sensor, a body sensor, a game controller, etc. The input devices 240-640 are coupled to the processor 220-620 respectively to input information from the outside world to the processors 220-620. In some embodiments, the output devices 250-650 can include, but not limited to, a display, a touch display, a speaker, an earphone, a vibration device, a touch sense emulator, a smell generator, a temperature controller, a humidity controller, a game controller, etc. The output devices 250-650 are coupled to the processors 220-620 respectively, in order to output information from the processors 220-620 to the outside world.

In some embodiments, units of the user ends 200-600 can be disposed on a closed/semi-closed space. In this way, an integration of the input devices 240-640 and the output devices 250-650 forms a simulated environment input/output device. For instance, the input/output devices, such as head mounted display (HMD) and corresponding controllers, can be settled in such space so that the user can obtain information via different senses. The system can provide the user with immersive experiences through augmented reality (AR), virtual reality (VR) and mixed reality (MR) simulations.

Figure 2A:
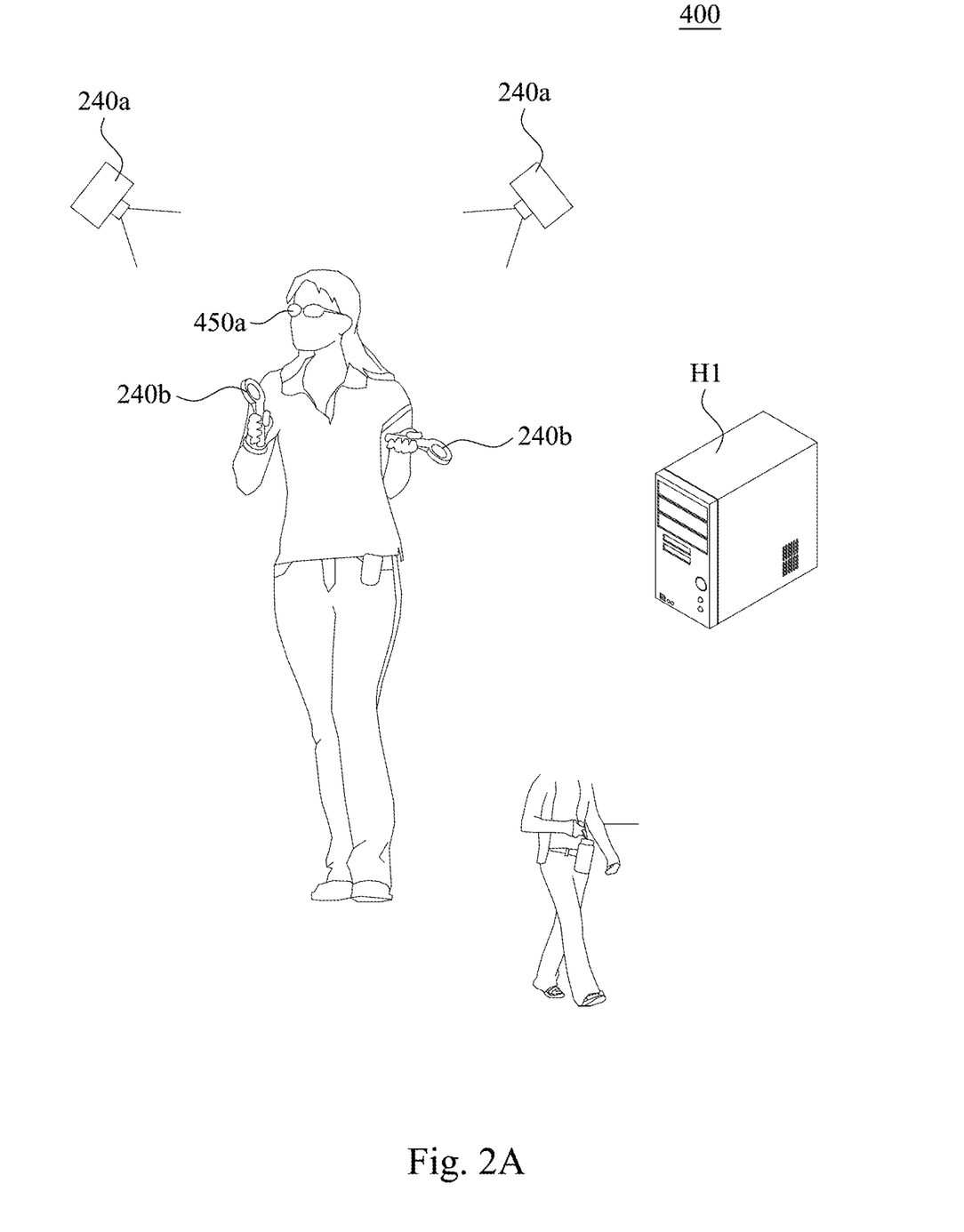
FIG. 2A is a schematic diagram showing parts of a network learning system according to some embodiments of present disclosure.
Figure 2B:
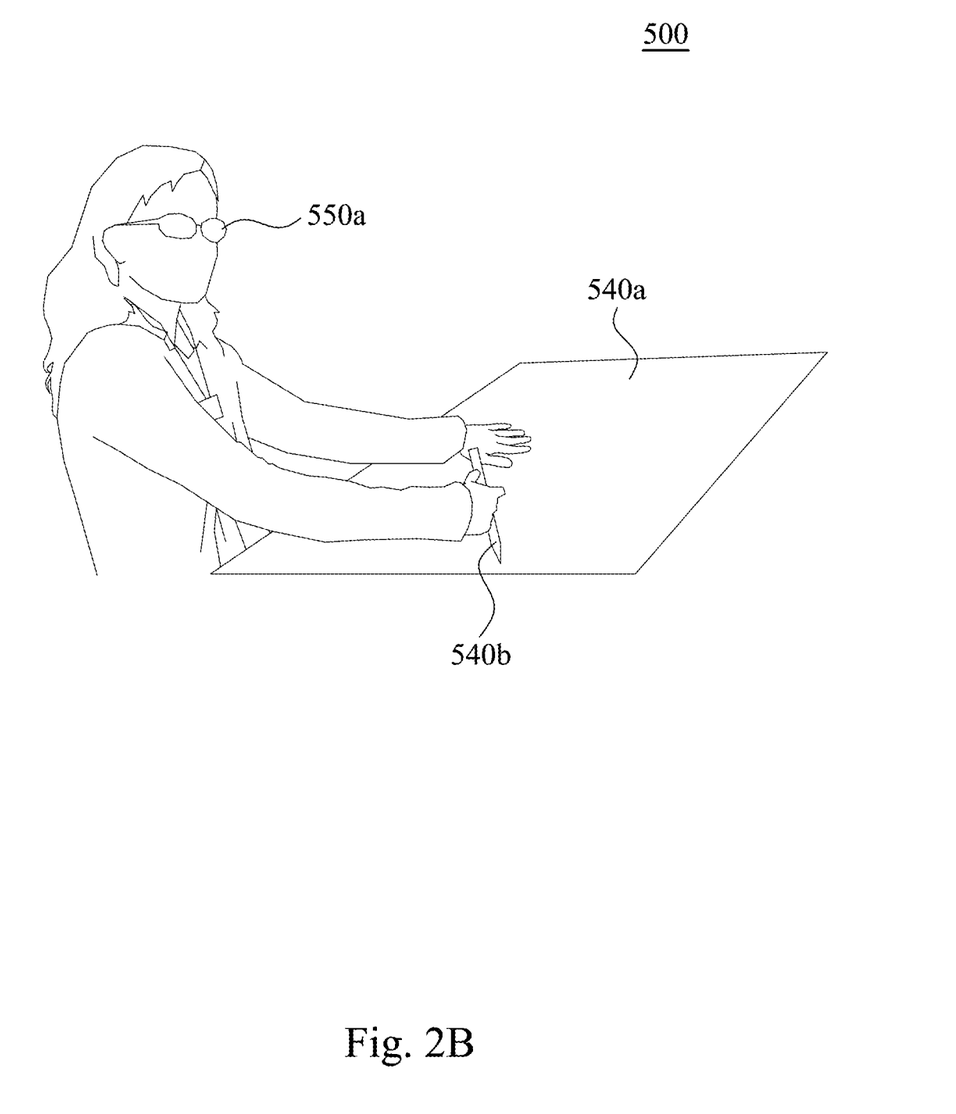
FIG. 2B is a schematic diagram showing parts of a network learning system according to some embodiments of present disclosure.

For better understandings of present disclosure, reference can be made to FIGS. 2A-2B. FIG. 2A and FIG. 2B are schematic diagrams showing parts of a network learning system according to some embodiments of the present disclosure.

In some embodiments, FIG. 2A shows hardware configuration of the user end 400. A computer H1 that runs the user end 400 includes the memory 410 and the processor 420 shown in FIG. 1. As shown in FIG. 1, the input device 440 at least includes a set of camera 240a and a pair of game controllers 240b. As shown in FIG. 1, the output device 450 at least includes a head mounted display 450a. According to the configuration of the user end 400 in FIG. 2A, a user of the user end 400 can control the user end 400 with the standing posture.

In some embodiments, FIG. 2B shows hardware configuration of the user end 500. A computer H2 that runs the user end 500 includes the memory 510 and the processor 520 shown in FIG. 1. As shown in FIG. 1, the input device 540 can be, for example, a touch display 540a, a writing panel, a touch pen 540b, a controller or a keyboard having functions of input and display. As shown in FIG. 1, the output device 550 can be, for example, a head mounted display 550a. The head mounted display 550a can be an augmented reality (AR) head mounted display or glasses that presents combinations of virtual information and real views. In another example, the head mounted display 550a can be a virtual reality (VR) head mounted display or glasses that displays a virtual space for a user (controller) of the user end 500 to have a tour in or interact with. According to the configuration of the user end 500 in FIG. 2b, the user of the user end 500 can control the user end 500 in seating.

In general, the network learning system NS can be operated to run a collaborative learning platform with an environment integrated by virtual objects and real objects. Via network connection, the host end 100 is a center of the platform and the user ends 200-600 are collaborators of the platform. Users of the platform (e.g. learners and lecturers around the world) can be provided with virtual classrooms. In the classrooms, users can participate in some synchronous/asynchronous lessons running in a modularized learning process.

Figure 3:
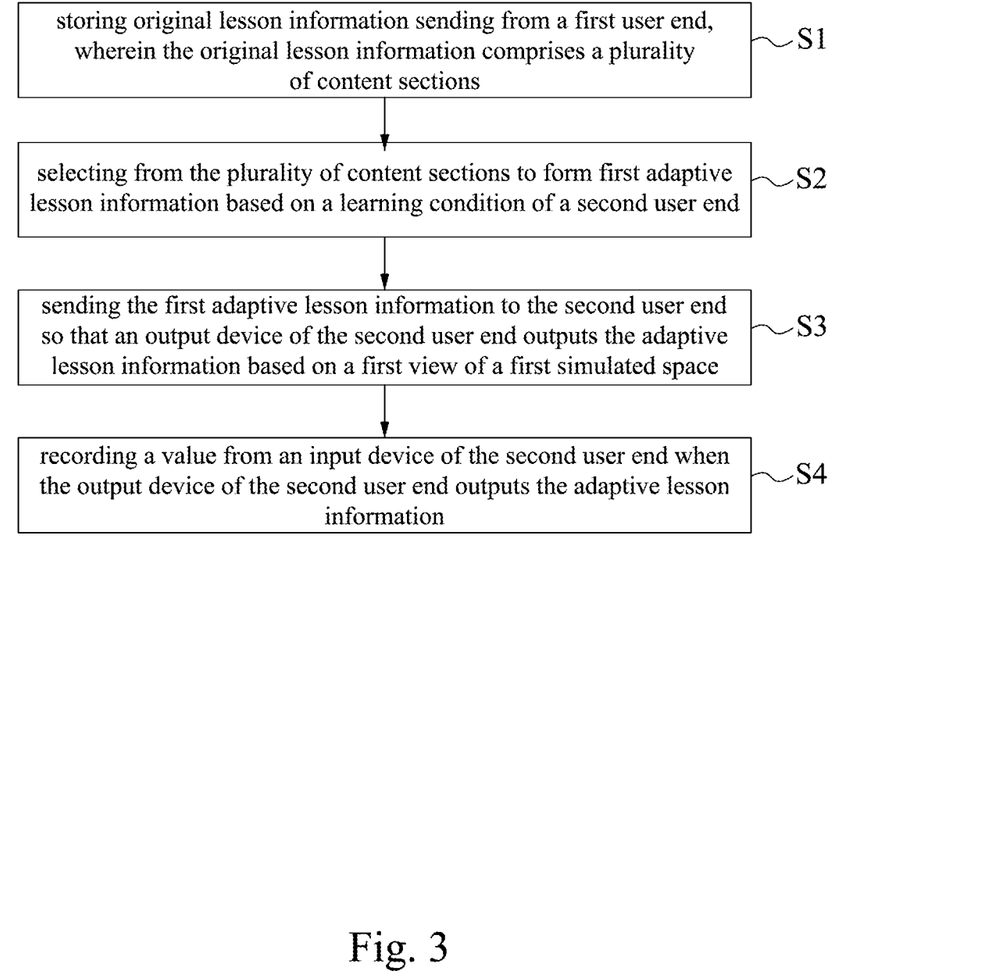
FIG. 3 is a flow chart showing a network learning method according to some embodiments of present disclosure.

Reference can be made to FIG. 3. FIG. 3 is a flow chart showing a network learning method according to some embodiments of present disclosure. As shown in FIG. 3, in some embodiments, the network learning method can be performed by the host end 100 in association with the user ends 200-600 in FIG. 1. Hence, references can be made to FIG. 1 if necessary.

It is noted that the user ends 200-600 of the network learning system NS can be selectively controlled by different users. Each of the users can have an identity of character in the classroom, which at least includes: (1) a learner, which is a character being taught in the virtual classroom. (2) a content provider, which is a character that designs, arranges, and publishes contents of a lesson. (3) a moderator, which is an administrative character that controls time of the lesson and arranges the flow of teaching in the virtual classroom. (4) a facilitator, which is a character that helps the moderator and answer questions in the virtual classroom. However, the scope of present disclosure is not limited by the embodiment. In some embodiments, the character identity corresponding to the user ends 200-600 (e.g. corresponding to a first user end to a fifth user end) are registered in the network learning system NS. A storage of the host end 100 (e.g. the memory 110) stores such registration information. A user of the user end 200 can be a content provider. A user of the user end 300 can be a moderator. A user of the user end 400 can be a facilitator. Users of the user end 500 and the user end 600 can be learners.

It is noted that the users can control the processor 220-620 of the user ends 200-600, so that the processor 220-620 of the user ends 200-600 can connect to the communication device 130 of the host end 100 via the communication devices 230-630. For ease of understanding, if the user ends 200-600 are described to be connected to the host end 100, it can be understood that the processor of the user end is connected to the processor of the host end via corresponding communication device(s). The connection between the communication devices and the processors and the way of transferring information therebetween are not further given in the following paragraphs.

More specifically, the network learning method of FIG. 1 can be the application mentioned in the embodiments of FIG. 1. The method is substantially performed by the processor 120 according to the computer readable instruction read from the memory 110. Detail steps of the method are explained in following paragraphs.

S1: original lesson information sending from a first user end is stored, in which the original lesson information comprises a plurality of content sections.

In some embodiments, a content provider can use the user end 200 to design/edit at least one lesson having multi-level related contents. For instance, a designed practice lesson of machine operation can at least include following modularized content sections (or say activities): (A) a check before start section, length of section: 4 minutes. (B) a turn-on the machine section, length of section: 4 minutes. (C) a material installation section, length of section: 4 minutes. (D) a material processing section, length of section: 16 minutes. (E) product inspection section, length of section: 10 minutes. (F) turn-off the machine section, length of section: 2 minutes. The practice lesson is 40 minutes in full length. Learners can practice detail operations of some specific processes on a specific machine. In some embodiments, each section can be formed by several sub-activities in different lengths.

In some embodiments, the practice lesson (or the content sections) can be correspond to specific input/output devices. For example, the practice lesson of machine operation can at least include following versions: (A) a version using real tools, which is a version provided for the user to operate with real tools, such as a hex-key wrench or some screws, so that the user can practice in the virtual classroom. (B) a version with delicate operations, which is a version provided for the user to operate with game controllers, cameras and body sensors so that the user can have intuitive experiences of simulation in the virtual classroom. (C) a version with simplified operations, which is a version provided for the user to operate with the mouse and the keyboard so that the user can have experiences of simulation in the virtual classroom. It is noted that these versions can be considered some multi-level contents of this practice lesson.

In some embodiments, the memory 210 of the user end 200 can store this practice lesson of machine operation. The user end 200 can upload information of the practice lesson of machine operation to the host end 100. The processor 120 of the host end 100 can store such information of the practice lesson of machine operation in some storage device (e.g. the memory 110). In some embodiments, through such process, the storage device (e.g. the memory 110) can store information of many original lessons having different contents from different content providers.

S2: the plurality of content sections are selected to form first adaptive lesson information based on a learning condition of a second user end.

In some embodiments, learners can request the host end 100 for a single-learner lesson. For instance, the user of the user end 500 can control the input device 540 to connect the user end 500 with the host end 100. The user of the user end 600 can control the input device 640 to connect the user end 600 with the host end 100. Then, the host end 100 can transmit a list of recommend lessons to the user end 500 and the user end 600. The user end 500 and the user end 600 can send a request for lesson to the host end 100 according to the list of recommend lessons. In this way, virtual classrooms can be created in a specific time in the future, so that each of the learners can take this practice lesson of machine operation alone.

In some embodiments, learners can actively request the host end 100 for a multi-learner lesson. For example, the user of the user end 500 can control the input device 540 to connect to the user end 500 with the host end 100. If there were a virtual classroom for this practice lesson of machine operation in the network, the user end 500 can join the virtual classroom directly (or ask the moderator of the classroom to join).

In some embodiments, learners can passively join a multi-learner lesson. For instance, the user of the user end 300 (i.e. corresponding to the first user) can control the input device 340 to connect to the user end 300 with the host end 100. The user end 300 can hold the virtual classroom for this practice lesson of machine operation in a specific time in the future as a moderator. The user end 300 can send a lesson invitation to the user ends 400-600 (i.e. corresponding to the second user to the fifth user) to invite the users of the user ends 400-600 to join the virtual classroom for the practice lesson at the time. The users of the user ends 400-600 can control the user ends 400-600 to accept/refuse the lesson invitation. If the users of the user ends 400-600 accept the lesson invitation, the users can control the user ends 400-600 to join the virtual classroom at the specific time.

In some embodiments, the host end 100 can dynamically select at least one content section of a specific lesson to form adaptive lesson information for the user based on the user's learning conditions.

In some embodiments, the learning condition can be the user's time of learning. The host end 100 can rearrange/reorder the multi-level contents of this practice lesson of machine operation to form an adaptive lesson for the user based on the time of learning. For example, the user of the user ends 400-600 can set the time of learning (e.g. 26 minutes), the host end 100 can generate an adaptive lesson by combining contents (B), (C), (D), (F) so that the user can take a resized version of lesson with important parts within a limited time. In another example, the users of the user ends 400-600 can define sections of interest content (e.g. the processing section), the host end 100 can generate an adaptive lesson by combining (or assembling) contents (C), (D), (E) so that the user can take a resized version of lesson with interesting parts. In still another example, if each of the sections (A)-(F) includes multiple sub-activities, the host end 100 can rearrange/combine some of the sub-activities to generate a new version of practice lesson adapted to the user. However, ways of the dynamic rearrangement of lessons are not limited to the embodiment above.

In some embodiments, the learning condition can be a hardware configuration of the user. The host end 100 can rearrange/reorder the multi-level contents of this practice lesson of machine operation to form an adaptive lesson for the user based on the hardware configurations of the user ends 400-600. For example, the input device 440 of the user end 400 includes a game controller, a camera and a body sensor, the host end 100 can provide an adaptive lesson according to mentioned version (B). In another example, the input device 640 of the user end 600 can be a mouse and a keyboard, the host end 100 can provide an adaptive lesson according to mentioned version (C). In some embodiments, the host end 100 can provide lessons constructed by different multi-level contents to the users in the same virtual classroom. For instance, the user end 400 and the user end 500 are in the same virtual classroom but the hardware of the user end 400 is better than the hardware of the user end 500, the host end 100 can provide the user end 400 and the user end 500 with the same lesson material in different hardware-adapted versions. However, ways of the dynamic rearrangement of lessons are not limited to the embodiment above.

It is noted that, other than the user's time of learning and the hardware configuration of the user, the learning condition can be a number of users (if some contents require multiple learners but there is only one user, single user contents would be selected instead). In another example, the learning condition can be the available space for activity (if some contents require a large available space for activity but the user fails to provide such place, other contents would be selected instead). In still another example, the learning condition can be a network condition (if some contents require a stable network connection but the current connection shows the opposite, other contents would be selected instead).

S3: the first adaptive lesson information is sent to the second user end, so that an output device of the second user end outputs the adaptive lesson information based on a first view of a first simulated space.

In some embodiments, when the host end 100 generates the adaptive lesson information for the users, the adaptive lesson information can be sent to the user ends 300-600 respectively. The user ends 300-600 can show at least one image via the output device 350-650 (e.g. the head mounted display) in which the at least one image corresponds to a view angle in the virtual classroom (e.g. the second user of the user end 300 may see the adaptive lesson information made for him/her in a first view that the user end 300 is assigned in the virtual classroom). In some embodiments, the output devices 350-650 of the user ends 300-600 can display images corresponding to different view angles in the virtual classroom (e.g. the user end 300 can show a second view of the virtual classroom or the user end 400 can show a third view of the virtual classroom, etc.)

In some embodiments, each of the users corresponding to the user ends 300-600 (including the moderator, the facilitator and the learner) can have a virtual avatar in the virtual classroom. The appearance of the avatars can be system default or designed by the users. When the users of the user ends 300-600 observe the virtual classroom via the output device 350-650 (e.g. a display of the head mounted display), users can see the avatars of other users or some specific parts (e.g. limbs) of its own avatar.

Figure 4:
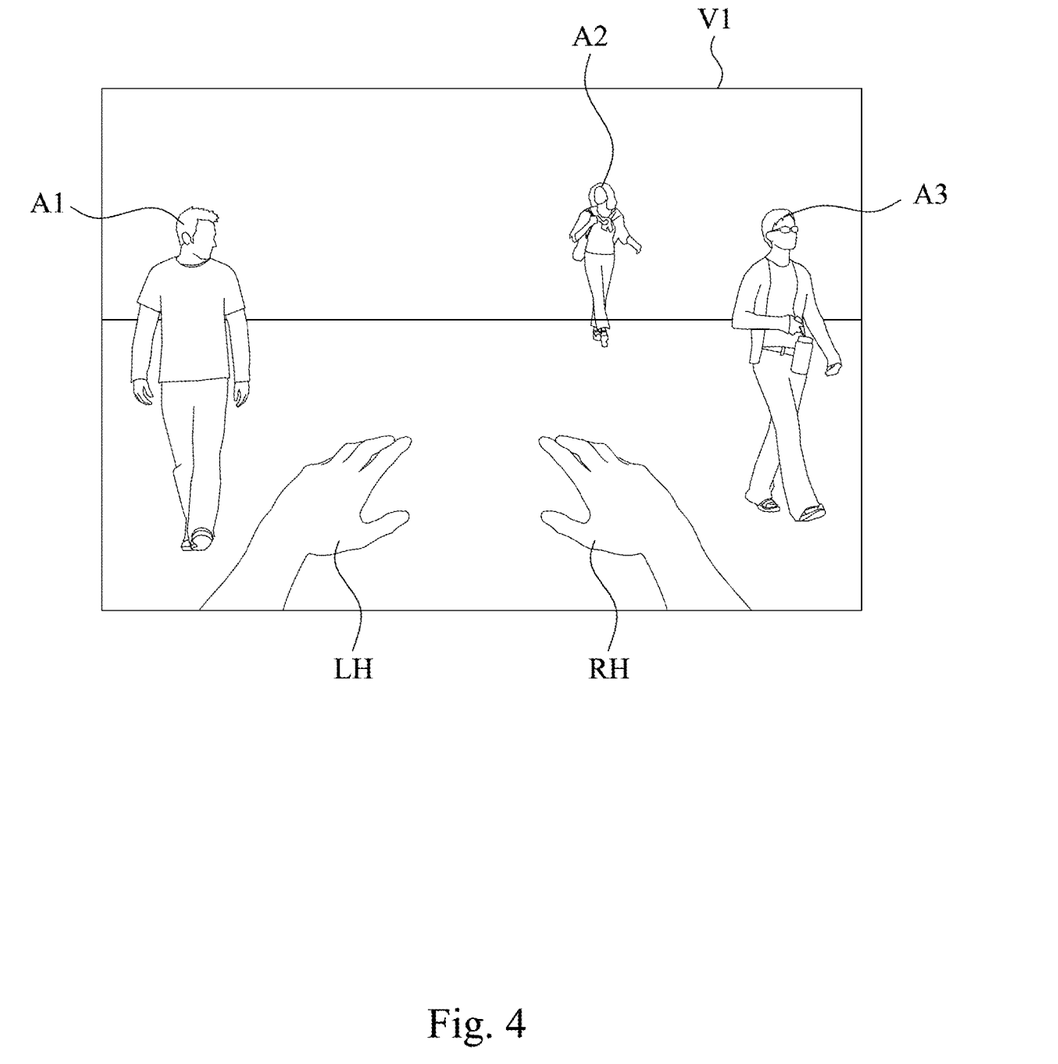
FIG. 4 is a schematic diagram showing a simulated environment according to some embodiments of present disclosure.

For better understandings of present disclosure, reference can be made to FIG. 4 of present disclosure. FIG. 4 is a schematic diagram showing a simulated environment according to some embodiments of present disclosure. In some embodiments, the user of the user end 600 can see a view V1 via the output device 650. The view V1 corresponds to a view angle that the user's avatar may see in the virtual classroom (i.e. a simulated space that looks like a classroom). As shown in FIG. 4, in the view V1, the user can see a left hand LH and a right hand RH of its avatar. As shown in FIG. 4, in the view V1, the user can also see the avatars A1-A3 of other users. When the learners take the lesson, the user of the user end 600 can observe actions of other users through the actions of avatars A1-A3 in the view V1.

S4: a value from an input device of the second user end is recorded when the output device of the second user end outputs the adaptive lesson information.

In some embodiments, when the learners take the lesson, the input devices 340-640 of the user ends 300-600 can detect multiple physical values, including environmental values and the values from the user. For example, body sensors and inertial sensors can obtain a moving coordinate, an angle, a velocity, a touching pressure of the body (i.e. limbs, torso, head) of the user, or an angle of gesture/finger of the user. The environmental value detection can be established by sensing temperature with temperature sensors, sensing humidity with humidity sensors, detecting sounds with microphones, and detecting distance, luminance, color with cameras or optical sensors, etc. The user ends 300-600 can transmit the physical values to the host end 100. In this case, the host end 100 can obtain actions of the users and reflect the actions onto the avatars of the users. Hence, users can observe the action of other users in the virtual classroom to understand the operations of others. The moderators and facilitators can see the work of the learners and decide the progress of the lesson or the order of content arrangements. In some embodiments, the physical values can be stored in a storage device (e.g. the memory 110) of the host end 100.

In some embodiments, the input devices 340-640 (e.g. a body sensor or an inertial sensor) of the user ends 300-600 can detect multiple biometrical values. For example, brainwave reader can detect brainwave changes of the users, microphone can detect voice fingerprint of the users, camera can perform an eye tracking of the users, or the heartbeat detector can sense heartbeats of the users, etc. The user ends 300-600 can sent these values to the host end 100. The processor 120 of the host end 100 can perform an analysis process to generate a leaning report (e.g. in graphs) related to the users. For instance, a high frequency of discussion can represent a better interaction between the users. Significant changes of brainwave can represent that the users are more concentrate in the lesson. In some embodiments, the biometrical values can be stored in a storage device (e.g. the memory 110) of the host end 100.

In some embodiments, the users of the user ends 300-600 can access the leaning report from the host end 100 in a real-time manner or after the lesson is finished. The leaning report can help the participants of the lesson (including the moderator, the facilitator and the learner) to understand the situation of users in the class. In this way, the moderator and the facilitator can decide whether to adjust contents of the lesson or provide the learners with helps. In some embodiments, the user of the user end 200 (i.e. the content provider) can also access the leaning report from the host end 100. The content provider can read the leaning report and determine whether the practice lesson can be modified. The user of the user end 200 can control the user end 200 to send the modified practice lesson to the host end 100. The host end 100 can access the storage device and update the contents of the practice lesson.

In some embodiments, based on the physical values and the biometrical values, the processor 120 can generate a record of lessons. The record of lesson can be a visual-audio record that replays the actions and interactions of the user's avatar in the class. In this manner, the learners need to review or the learners that were not in the class can interact with the users by replaying the record of lesson. It is noted that, in some embodiments, the users can select from three replay modes having a replay view different from the views mentioned above, which are: (1) as a bystander, which is an identity that allows the user to view other user's avatar in the classroom according to different angles of view (e.g. the recorded acts of the first user in the virtual classroom can be played in the second view so that the second user can view the acts of the first user's avatar by its side). (2) as a new learner, which is an identity that allows the users avatar to join the virtual classroom to participate in the activities. (e.g. the second user can view the acts of others from a view of the second user's avatar being assigned in the virtual classroom) (3) as a replacement of other learners, which is an identity that allows the users avatar to replace one of the other avatars in the virtual classroom. (e.g. the second user can view the acts of others from a third view of the third user's avatar being assigned in the virtual classroom) In this way, the user can participate in the activities and interact with other learners based on the view angle of the avatar being replaced In some embodiments, the record of lesson has a plurality of segments. Each of the segments corresponds to a section content of the practice lesson of machine operation. The users of the user ends 200-600 can control the user ends 200-600 to replay some specific segments of the record of lesson in order to save time of practice.

In some embodiments, the processor 120 can input the physical values and the biometrical values to a machine learning process based on specific algorithms, such as a reinforcement learning algorithm, etc. The machine learning process can generate some character models corresponding to the characters in the virtual classroom (including the moderator, the facilitator and the learner) and optimize these character models based on the values being collected afterwards. In some embodiments, the processor 120 can provide some robot avatars according to these character models into some virtual classrooms of some other users (e.g. a second classroom other than the aforementioned virtual classroom). The robot avatars can join the classroom to interact with other users as being roles of some specific characters. In some embodiments, the processor 120 can manipulate some specific electric devices or mechanical devices according to the character models. For instance, a character models trained by information collected from the practice lesson of machine operation can be used to control robotic arms. In this way, the robotic arms can imitate the users' actions for operating the machine.

It is noted that, in foregoing embodiments, the host end 100 and the user ends 200-600 are units comprising multiple hardware pieces. However, the embodiments are not intended to limit the configuration of these units. In some embodiments, the host end 100 and the user ends 200-600 can refer to software unit or firmware unit running on the hardware (especially the processor). Such software or firmware unit can be stored in at least one non-transitory computer readable mediums (e.g. the memory 110-610) to establish the functions of the host end 100 and the user ends 200-600 mentioned in above embodiments.

In foregoing embodiments, the network learning system NS (including the host end 100 and the user ends 200-600) of present disclosure has multiple functional blocks or modules. As will be appreciated by persons skilled in the art, in some embodiments, these functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. However, the scope of present disclosure is not limited thereto.

According to foregoing embodiments, present disclosure provides a network learning system and a network learning method that can dynamically adjust contents of lessons based on users learning time, hardware configuration, number of users, space available for activity or network condition. The system and method can provide the adjusted contents of lessons to the users via virtual classrooms. The system and method can further collect values of the users in class for training machine learners or controlling other electric/mechanical devices.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A network learning system, comprising:
   a host end, coupled to a first user end and a second user end, the host end comprising:
   a memory, configured to store at least one instruction; and
   a processor, coupled to the memory, the processor configured to access the at least one instruction to perform steps of:
   storing original lesson information sending from the first user end, wherein the original lesson information comprises a plurality of content sections, wherein the plurality of content sections comprise a plurality of multi-level related contents, wherein the plurality of multi-level related contents correspond to a plurality of time lengths of section respectively;
   selecting from the plurality of multi-level related contents to form first adaptive lesson information based on a learning condition of the second user end, wherein the learning condition is a time of learning set by the second user end, and the processor reorder the selected multi-level related contents to form the first adaptive lesson information to match the time of learning;

sending the first adaptive lesson information to the second user end, so that an output device of the second user end outputs the first adaptive lesson information based on a first view of a first simulated space; and recording a value from an input device of the second user end when the output device of the second user end outputs the first adaptive lesson information.

2. The network learning system of claim 1, wherein the learning condition is a time of learning, a hardware configuration, a number of users, a space available for activity, a network condition, or a combination thereof.

3. The network learning system of claim 1, wherein the processor records and assembles the plurality of content sections based on the learning condition, in order to generate the first adaptive lesson information.

4. The network learning system of claim 1, wherein the value from the input device of the second user end is a physical value, a biometrical value, or a combination thereof.

5. The network learning system of claim 4, wherein the processor is further configured to access the at least one instruction to perform a step of:

generating a record of lessons based on the value, wherein the record of lesson is for being accessed by the first user end or the second user end, in order to replay the first adaptive lesson information based on a second view of the first simulated space.

6. The network learning system of claim 5, wherein the second view is different from the first view.

7. The network learning system of claim 4, wherein the physical value is a moving coordinate, an angle, a velocity, a touching pressure of a body of a user corresponding to the second user end, an angle of gesture, an angle of finger of the user, or environmental measurement around the user, or a combination thereof.

8. The network learning system of claim 4, wherein the biometrical value is a brainwave, a voice fingerprint, an eye tracking, a heartbeat of a user corresponding to the second user end, or a combination thereof.

9. The network learning system of claim 4, wherein the processor is further configured to access the at least one instruction to perform steps of:

inputting the value to a machine learning process, in order to generate a plurality of character models; and when an output device of a third user end outputs second adaptive lesson information based on a second view of a second simulated space, providing a robot avatar to the second simulated space based on at least one of the plurality of character models as an aid.

10. The network learning system of claim 4, wherein the processor is further configured to access the at least one instruction to perform steps of:

inputting the value to a machine learning process in order to generate a plurality of character models; and manipulating an electric device or a mechanical device based on at least one of the plurality of character models.

11. The network learning system of claim 4, wherein the host end is further coupled to a fourth user end, and the processor is further configured to access the at least one instruction to perform steps of:

in response to an invitation sending from the second user end to the fourth user end or in response to an application sending from the fourth user end to the second user end, selecting from the plurality of content sections to form third adaptive lesson information based on a learning condition of the fourth user end;

sending the third adaptive lesson information to the fourth user end so that an output device of the fourth user end outputs the third adaptive lesson information based on a third view of the first simulated space, wherein the third view is different from the first view; and recording a value from an input device of the fourth user end when the output device of the fourth user end outputs the third adaptive lesson information.

12. A network learning method, performed by a host end, comprising steps of:

storing original lesson information sending from a first user end, wherein the original lesson information comprises a plurality of content sections, wherein the plurality of content sections comprise a plurality of multi-level related contents, wherein the plurality of multi-level related contents correspond to a plurality of time lengths of section respectively;

selecting from the plurality of multi-level related contents to form first adaptive lesson information based on a learning condition of a second user end, wherein the learning condition is a time of learning set by the second user end, and the processor reorder the selected multi-level related contents to form the first adaptive lesson information to match the time of learning;

sending the first adaptive lesson information to the second user end so that an output device of the second user end outputs the first adaptive lesson information based on a first view of a first simulated space; and recording a value from an input device of the second user end when the output device of the second user end outputs the first adaptive lesson information.

13. The network learning method of claim 12, wherein the learning condition is a time of learning, a hardware configuration, a number of users, a space available for activity, a network condition, or a combination thereof.

14. The network learning method of claim 12, wherein the host end reorders and assembles the plurality of content sections based on the learning condition, in order to generate the first adaptive lesson information.

15. The network learning method of claim 12, wherein the value from the input device of the second user end is a physical value, a biometrical value, or a combination thereof.

16. The network learning method of claim 15, further comprising a step of:

generating a record of lessons based on the value, wherein the record of lessons is for being accessed by the first user end or the second user end, in order to replay the first adaptive lesson information based on a second view of the first simulated space.

17. The network learning method of claim 15, wherein the physical value is a moving coordinate, an angle, a velocity, a touching pressure of a body of a user corresponding to the second user end, an angle of gesture, an angle of finger of the user, or environmental measurement around the user, or a combination thereof.

18. The network learning method of claim 15, wherein the biometrical value is a brainwave, a voice fingerprint, an eye tracking, a heartbeat of a user corresponding to the second user end, or a combination thereof.

19. The network learning method of claim 15, further comprising steps of:
   inputting the value to a machine learning process in order to generate a plurality of character models; and
   when an output device of a third user end outputs second adaptive lesson information based on a second view of a second simulated space, providing a robot avatar to the second simulated space based on at least one of the plurality of character models as an aid.

20. The network learning method of claim 15, further comprising steps of:
   inputting the value to a machine learning process in order to generate a plurality of character models; and
   manipulating an electric device or a mechanical device based on at least one of the plurality of character models.

\* \* \* \* \*